US012782984B2

(12) United States Patent
Chu et al.

(10) Patent No.: US 12,782,984 B2
(45) Date of Patent: Nov. 3, 2026

(54) ENERGY STORAGE CONTAINER TEMPERATURE CONTROL METHOD, APPARATUS AND ELECTRONIC DEVICE

(71) Applicant: CORNEX NEW ENERGY CO., LTD., Xiaogan (CN)

(72) Inventors: Li Chu, Xiaogan (CN); Xibin Wu, Xiaogan (CN)

(73) Assignee: CORNEX NEW ENERGY CO., LTD., Wuhan City (CN)

( * ) Notice: Subject to any disclaimer, the term of this patent is extended or adjusted under 35 U.S.C. 154(b) by 647 days.

(21) Appl. No.: 18/347,424

(22) Filed: Jul. 5, 2023

(65) Prior Publication Data

US 2024/0353877 A1 Oct. 24, 2024

(30) Foreign Application Priority Data

Apr. 20, 2023 (CN) ......................... 202310431463.2

(51) Int. Cl.
*G05D 23/19* (2006.01)

(52) U.S. Cl.
CPC ................................ *G05D 23/1917* (2013.01)

(58) Field of Classification Search
None
See application file for complete search history.

(56) References Cited

U.S. PATENT DOCUMENTS

| | | | | |
|---|---|---|---|---|
| 10,161,651 B2 * | 12/2018 | Kojima | F24F 11/76 | |
| 10,635,060 B2 * | 4/2020 | Leal | G05B 15/02 | |
| 11,787,387 B2 * | 10/2023 | Sakaray | B60L 58/26 | 429/120 |

(Continued)

FOREIGN PATENT DOCUMENTS

| | | |
|---|---|---|
| CN | 108829149 A | 11/2018 |
| CN | 111427401 A | 7/2020 |

(Continued)

OTHER PUBLICATIONS

Jul. 4, 2024, Extended European Search Report issued in European Patent Application No. 23183107.4 (7 pages).

*Primary Examiner* — Jennifer L Norton
(74) *Attorney, Agent, or Firm* — United IP Counselors, LLC

(57) ABSTRACT

An energy storage container temperature control method, an apparatus, and an electronic device are disclosed. The method comprises obtaining a current temperature parameter in the energy storage container; obtaining a preset threshold parameter of the energy storage container; and controlling an air conditioner, an internal circulation fan and an external circulation fan of the energy storage container, according to the current temperature parameter and the preset threshold parameter, to control a temperature value in the energy storage container within a preset temperature range. The present disclosure can control an air conditioner, an internal circulation fan, and an external circulation fan of the energy storage container more accurately based on different temperatures and the preset threshold parameters in the energy storage container, thereby improving the temperature control accuracy, reducing the energy loss of the energy storage container itself, and improving the security performance of the energy storage container.

3 Claims, 7 Drawing Sheets

(56) References Cited

U.S. PATENT DOCUMENTS

2001/0052412 A1* 12/2001 Tikka ..................... H05K 7/206
165/104.34
2006/0110657 A1* 5/2006 Stanton ............... H01M 10/121
429/96
2009/0248204 A1 10/2009 Kikuchi et al.
2009/0305124 A1* 12/2009 Ahn .................... H01M 10/659
429/120
2010/0165572 A1* 7/2010 Fink ..................... H05K 7/2079
361/695
2010/0276120 A1* 11/2010 Takagi ................ H01M 6/5038
165/104.33
2012/0100794 A1* 4/2012 Redshaw ................ G06F 1/206
454/184
2013/0017419 A1* 1/2013 Jin ...................... H01M 10/613
429/50
2017/0301967 A1* 10/2017 Kim ...................... H01M 10/63
2018/0095484 A1* 4/2018 George ..................... F24F 11/67
2019/0087389 A1* 3/2019 Ranjan ..................... G09G 5/14
2019/0154287 A1* 5/2019 Pham ................... F24F 11/0008
2020/0200425 A1* 6/2020 Xi ............................ F24F 11/64
2021/0170908 A1* 6/2021 Villanueva .......... H01M 50/204
2021/0194076 A1 6/2021 Wang et al.
2021/0194421 A1* 6/2021 Brown ................ H01M 10/425
2023/0243543 A1* 8/2023 Bush ......................... F24F 11/81
2023/0299389 A1* 9/2023 Chu .................... H01M 10/663
320/150
2024/0077897 A1* 3/2024 Ma ..................... G05D 23/1919

FOREIGN PATENT DOCUMENTS

CN 115629637 A 1/2023
EP 2407016 B1 * 10/2012 ........... H05K 7/2059

* cited by examiner

ENERGY STORAGE CONTAINER TEMPERATURE CONTROL METHOD, APPARATUS AND ELECTRONIC DEVICE

FIELD OF INVENTION

The present disclosure relates to technical field of energy storage container, in particular to energy storage container temperature control method, apparatus and electronic device.

BACKGROUND OF THE INVENTION

In recent years, energy storage technology has been vigorously developed in new energy field, and the mobile energy storage container system is the main way to build current energy storage system, which plays a significant economic value in wind power, solar energy, and staggered peak industrial power consumption. However, the energy storage container generates a lot of heat in the interior of chamber during operation, which leads to the increase of temperature, and at the same time, the temperature between different areas of the energy storage container is uneven and varies greatly. Therefore, how to control the temperature inside the energy storage container accurately and scientifically to improve the safety performance of the energy storage container has become an urgent issue to be solved.

SUMMARY

The purpose of the present disclosure is to solve at least one of the technical problems in the related technology to a certain extent.

Therefore, the first purpose of the present disclosure is to provide an energy storage container temperature control method, which is used to solve the technical problem of inaccurate and unscientific of the temperature control in the energy storage container in the existing technology.

In order to achieve the above-mentioned purpose, an embodiment of the first aspect of the present disclosure provides an energy storage container temperature control method, the method comprises: obtaining a current temperature parameter in the energy storage container; obtaining a preset threshold parameter of the energy storage container, wherein the preset threshold parameter comprises a preset temperature maximum value and a preset temperature minimum value; and controlling an air conditioner, an internal circulation fan and an external circulation fan of the energy storage container, according to the current temperature parameter and the preset threshold parameter, to control a temperature value in the energy storage container within a preset temperature range.

In addition, according to the energy storage container temperature control method of the above-mentioned embodiment in the present disclosure the method can also have the following additional technical features: According to an embodiment of the present disclosure, the current temperature parameter in the energy storage container comprises a current temperature maximum value in the energy storage container, a current temperature minimum value in the energy storage container, and a current temperature average value in the energy storage container.

According to an embodiment of the present disclosure, the current temperature parameter in the energy storage container further comprises a current temperature rise rate in the energy storage container, and the preset threshold parameter also comprises a temperature rise rate threshold.

According to an embodiment of the present disclosure, the step of obtaining a current temperature parameter in the energy storage container comprises: collecting a temperature in the energy storage container to obtain N temperature values according to a preset collection frequency by setting N temperature sensors in the energy storage container, wherein N is a positive integer; sorting the N temperature values in descending order, determining a first sorted temperature value as the current temperature maximum value in the energy storage container, and determining a last sorted temperature value as the current temperature minimum value in the energy storage container; and calculating the N temperature values to obtain the current temperature average value in the energy storage container.

According to an embodiment of the present disclosure, the step of controlling an air conditioner, an internal circulation fan and an external circulation fan of the energy storage container according to the current temperature parameter and the preset threshold parameter comprises: in response to a preset time range, a difference between the current temperature maximum value and the current temperature average value being not less than a first temperature value, and the current temperature maximum value being not greater than the preset temperature maximum value; and controlling one fan to be in forward rotation and another fan to be in reverse rotation in the internal circulation fan; and in response to a difference between the current temperature maximum value and the current temperature average value being not greater than a second temperature value, controlling the internal circulation fan to stop working.

According to an embodiment of the present disclosure, the step of controlling an air conditioner, an internal circulation fan and an external circulation fan of the energy storage container according to the current temperature parameter and the preset threshold parameter comprises: in response to exceeding a preset time range, a difference between the current temperature maximum value and the current temperature average value being not less than a first temperature value, the current temperature maximum value being greater than the preset temperature maximum value and the current temperature rise rate being less than the temperature rise rate threshold, controlling one fan to be in forward rotation and another fan to be in reverse rotation in the internal circulation fan, and controlling the air conditioner to turn on cooling(refrigeration); and in response to the current temperature maximum value being not greater than a third temperature value, controlling the air conditioner to stop cooling work, and a difference between the current temperature maximum value and the current temperature average value being not greater than a second temperature value, controlling the internal circulation fan to stop working.

According to an embodiment of the present disclosure, the step of controlling an air conditioner, an internal circulation fan and an external circulation fan of the energy storage container according to the current temperature parameter and the preset threshold parameter comprises: in response to exceeding a preset time range, a difference between the current temperature maximum value and the current temperature average value being less than a first temperature value, and the current temperature maximum value being greater than the preset temperature maximum value and the current temperature rise rate being less than the temperature rise rate threshold, controlling the air conditioner to turn on cooling; and in response to the current temperature maximum value being not greater than a third temperature value, controlling the air conditioner to stop cooling work.

According to an embodiment of the present disclosure, the step of controlling an air conditioner, an internal circulation fan and an external circulation fan of the energy storage container according to the current temperature parameter and the preset threshold parameter comprises: in response to exceeding a preset time range, the current temperature maximum value being greater than the preset temperature maximum value, and the current temperature rise rate being greater than a temperature rise rate threshold, controlling the external circulation fan to start working; in response to the current temperature rise rate being not less than the temperature rise rate threshold, reducing a charging and discharging power in the energy storage container; and in response to the current temperature rise rate being not less than the temperature rise rate threshold, disconnecting a high pressure in the energy storage container and sending out a temperature anomaly warning message.

According to an embodiment of the present disclosure, the step of controlling an air conditioner, an internal circulation fan and an external circulation fan of the energy storage container according to the current temperature parameter and the preset threshold parameter comprises: in response to exceeding a preset time range, and the current temperature minimum value being not greater than the preset temperature minimum value, controlling one fan to be in forward rotation and another fan to be in reverse rotation in the internal circulation fan, and controlling the air conditioner to turn on heating; in response to the current temperature minimum value being greater than a fourth temperature value, controlling the air conditioner to stop heating; and when a difference between the current temperature average value and the current temperature minimum value is not greater than a second temperature value, controlling the internal circulation fan to stop working.

In order to achieve the above-mentioned purpose, an embodiment of the second aspect of the present disclosure provides an energy storage container temperature control apparatus, the apparatus comprises: a first acquisition device, for obtaining a current temperature parameter in an energy storage container; a second acquisition device, for obtaining a preset threshold parameter in the energy storage container, wherein the preset threshold parameter comprises a preset temperature maximum value, and a preset temperature minimum value; and a control device, for controlling an air conditioner, an internal circulation fan, and an external circulation fan of the energy storage container based on the current temperature parameter and the preset threshold parameter, controlling a temperature value in the energy storage container within a preset temperature range.

In addition, according to the energy storage container temperature control apparatus of the above-mentioned embodiment in the present disclosure can also have the following additional technical features:

According to an embodiment of the present disclosure, the current temperature parameter in the energy storage container comprises a current temperature maximum value in the energy storage container, a current temperature minimum value in the energy storage container, and a current temperature average value in the energy storage container.

According to an embodiment of the present disclosure, the current temperature parameter in the energy storage container further comprises a current temperature rise rate in the energy storage container, and the preset threshold parameter also comprises a temperature rise rate threshold.

According to an embodiment of the present disclosure, the first acquisition device also used to: collect a temperature in the energy storage container to obtain N temperature values according to a preset collection frequency by N temperature sensors set in the energy storage container, wherein N is a positive integer; sort the N temperature values in descending order, determining a first sorted temperature value as the current temperature maximum value in the energy storage container, and determining a last sorted temperature value as the current temperature minimum value in the energy storage container; and calculate the N temperature values to obtain the current temperature average value in the energy storage container.

According to an embodiment of the present disclosure, the control device also used to: in response to exceeding a preset time range, a difference between the current temperature maximum value and the current temperature average value being not less than a first temperature value, and the current temperature maximum value being not greater than the preset temperature maximum value, control one fan to be in forward rotation and another fan to be in reverse rotation in the internal circulation fan; and in response to a difference between the current temperature maximum value and the current temperature average value being not greater than a second temperature value, control the internal circulation fan to stop working.

According to an embodiment of the present disclosure, the control device also used to: in response to exceeding a preset time range, a difference between the current temperature maximum value and the current temperature average value being not less than a first temperature value, the current temperature maximum value being greater than the preset temperature maximum value and the current temperature rise rate being less than the temperature rise rate threshold, control one fan to be in forward rotation and another fan to be in reverse rotation in the internal circulation fan and control the air conditioner to turn on cooling; in response to the current temperature maximum value being not greater than a third temperature value, control the air conditioner to stop cooling work; and in response to a difference between the current temperature maximum value and the current temperature average value being not greater than a second temperature value, control the internal circulation fan to stop working.

According to an embodiment of the present disclosure, the control device also used to: in response to exceeding a preset time range, a difference between the current temperature maximum value and the current temperature average value being less than a first temperature value, the current temperature maximum value being greater than the preset temperature maximum value and the current temperature rise rate being less than the temperature rise rate threshold, control the air conditioner to turn on cooling; and in response to the current temperature maximum value being not greater than a third temperature value, control the air conditioner to stop cooling work.

According to an embodiment of the present disclosure, the control device also used to: in response to exceeding a preset time range, the current temperature maximum value being greater than the preset temperature maximum value, and the current temperature rise rate being greater than a temperature rise rate threshold, control the external circulation fan to start working; in response to the current temperature rise rate being not less than the temperature rise rate threshold, reduce a charging and discharging power in the energy storage container; and in response to the current temperature rise rate being not less than the temperature rise rate threshold, disconnect a high pressure in the energy storage container and send out a temperature anomaly warning message.

According to an embodiment of the present disclosure, the control device also used to: in response to exceeding a preset time range, the current temperature minimum value being not greater than the preset temperature minimum value, controlling one fan to be in forward rotation and another fan to be in reverse rotation in the internal circulation fan, and controlling the air conditioner to turn on heating; in response to the current temperature minimum value being greater than a fourth temperature value, controlling the air conditioner to stop heating; and in response to a difference between the current temperature average value and the current temperature minimum value being not greater than a second temperature value, controlling the internal circulation fan to stop working.

In order to achieve the above-mentioned purpose, an embodiment of the third aspect of the present disclosure provides an electronic device, the electronic device comprises a memory, a processor, and a computer program stored on the memory and capable of running on the processor, when the processor executes the computer program, the energy storage container temperature control method as claimed in any one of the embodiments of the first aspect can be implemented.

In order to achieve the above-mentioned purpose, an embodiment of the fourth aspect of the present disclosure provides a non instantaneous computer-readable storage medium stored computer instructions, when the computer instructions are executed by the computer, the energy storage container temperature control method can be implemented as claimed in any one of the embodiments of the first aspect of the present disclosure.

DETAILED DESCRIPTION OF THE EMBODIMENTS

In order to better understand the above-mentioned technical solution, the exemplary embodiment disclosed in this present disclosure will be described in more detail below with reference to the accompanying drawings. Although the exemplary embodiments of the present disclosure are shown in the accompanying drawings, it should be understood that the present disclosure can be implemented in various forms and should not be limited by the embodiments elaborated herein. On the contrary, these embodiments are provided in order to have a more thorough understanding of the present disclosure and to fully convey the scope of present disclosure to those skilled in the art.

The following refers to the accompanying figures to describe an energy storage container temperature control method and apparatus of an embodiment of the present disclosure.

Figure 1:
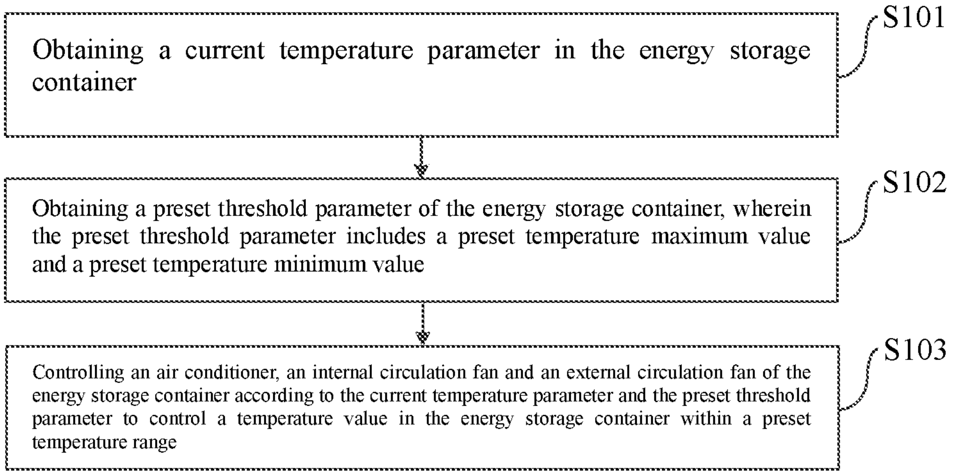
FIG. 1 is a schematic diagram of an energy storage container temperature control method disclosed by an embodiment of the present disclosure.

FIG. 1 is a flow schematic diagram of an energy storage container temperature control method disclosed by an embodiment of the present disclosure.

As shown in FIG. 1, an energy storage container temperature control method provided by an embodiment of the present disclosure, comprises the following steps:

S101: obtaining a current temperature parameter in the energy storage container.

In an embodiment of the present disclosure, the current temperature parameter in the energy storage container comprises a current temperature maximum value in the energy storage container, a current temperature minimum value in the energy storage container, and a current temperature average value in the energy storage container.

In the embodiment of the present disclosure, the current temperature parameter also comprises a current temperature rise rate in the energy storage container.

It should be noted that the present disclosure does not limit the specific method of obtaining current temperature parameters in the energy storage container, which can be selected based on actual situations.

Optionally, a temperature in the energy storage container can be collected to obtain N temperature values according to a preset collection frequency by N temperature sensors set in the energy storage container, wherein N is a positive integer; the N temperature values are sorted in descending order, a first sorted temperature value is determined as the current temperature maximum value Tmax in the energy storage container, and a last sorted temperature value is determined as the current temperature minimum value Tmin in the energy storage container; and the N temperature values are calculated to obtain the current temperature average value Tn in the energy storage container.

For example, temperature sensors can be evenly distributed at the bottom, middle, and top positions of the energy storage container. Three temperature sensors can be set at each arrangement position, resulting in a total of 9 temperature sensors, that is, N being 9. The temperature in the energy storage container can be collected to obtain 9 temperature values according to the preset collection frequency of 1 time per second (1 time/s), and the current temperature maximum value Tmax, the current temperature minimum value Tmin, and the current temperature average value Tn can be determined from 9 temperature values.

S102: Obtaining a preset threshold parameter of the energy storage container, wherein the preset threshold parameter comprises a preset temperature maximum value and a preset temperature minimum value.

In the embodiment of the present disclosure, the preset threshold parameter also comprises a temperature rise rate threshold.

It should be noted that the present disclosure does not limit the preset threshold parameter of the energy storage container which can be set according to actual situations.

Optionally, the preset temperature maximum value of the energy storage container can be set to 35° C., the preset temperature minimum value can be set to 18° C., and the temperature rise rate threshold can be set to 0.5° C./S.

S103: Controlling an air conditioner, an internal circulation fan, and an external circulation fan of the energy storage container according to the current temperature parameter and the preset threshold parameter to control a temperature value in the energy storage container within a preset temperature range.

In an embodiment of the present disclosure, after obtaining the current temperature parameter and the preset threshold parameter, the air conditioner, the internal circulation fan, and the external circulation fan of the energy storage container can be controlled based on the current temperature parameter and the preset threshold parameter, so that the temperature value in the energy storage container is controlled within the preset temperature range.

Figure 2:
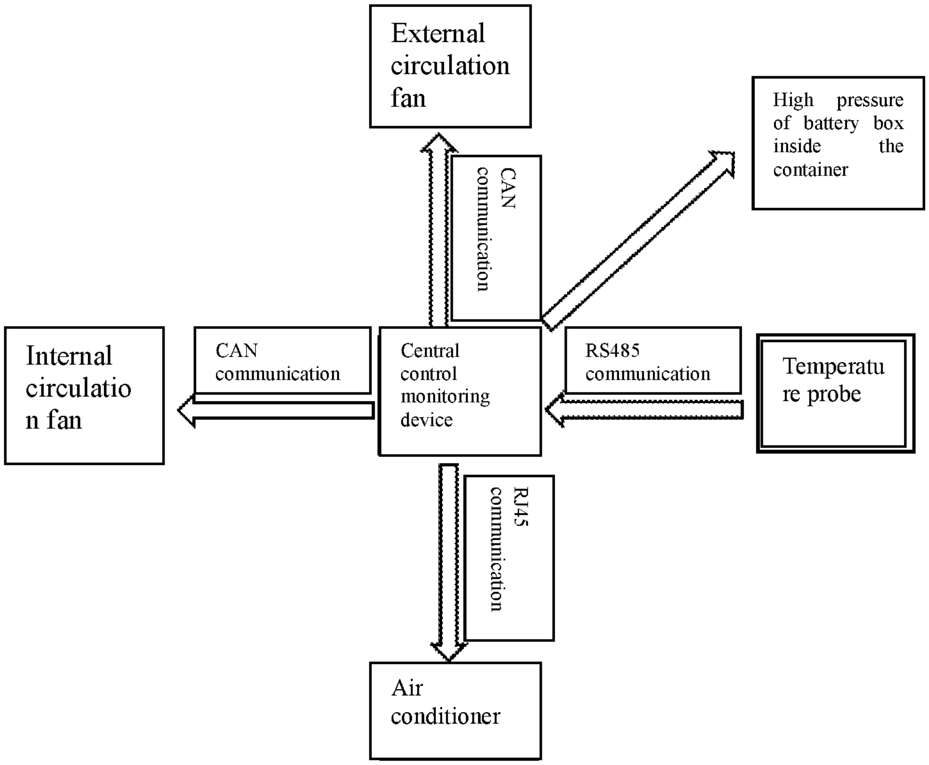
FIG. 2 is a schematic diagram of a temperature control of an energy storage container disclosed by an embodiment of the present disclosure.

For example, as shown in FIG. 2, the central control monitoring device (module) lets the temperature probe (temperature sensor) to collect the current temperature parameters in the energy storage container through RS485(Recommended Standard 485) communication, and controls the internal circulation fan and the external circulation fan through CAN (Controller Area Network) communication based on the preset threshold parameter in the energy storage container, and controls the air conditioner through RJ45 (Registered Jack45) communication to control the temperature value in the energy storage container within the preset temperature range.

For example, when the current temperature maximum value Tmax in the energy storage container is >35° C., control the air conditioner to start the cooling work. When the current temperature maximum value Tmax in the energy storage container is ≤28° C., control the air conditioner to stop cooling work. When the current temperature maximum value Tmax in the energy storage container is ≤18° C., control the air conditioner to start heating work and control the air conditioner to stop cooling work. And when the current temperature maximum value Tmax is >25° C., control the air conditioner to stop heating work.

The energy storage container temperature control method provided by the present disclosure obtains the preset threshold parameter of the energy storage container by obtaining the current temperature parameter in the energy storage container. Wherein the preset threshold parameter comprises a preset temperature maximum value, a preset temperature minimum value, and a temperature rise rate threshold. Control the air conditioner, the internal circulation fan, and the external circulation fan of the energy storage container according to the current temperature parameter and the preset threshold parameter, thereby the temperature value in the energy storage container is controlled within the preset temperature range. Therefore, the present disclosure can control the air conditioner, the internal circulation fan and the external circulation fan of the energy storage container more scientifically and accurately based on different temperatures and preset threshold parameters in the container. Thereby improving the temperature control accuracy in the energy storage container, reducing the energy loss of the energy storage container itself and improving the security performance of the energy storage container.

Following is an explanation of the specific process provided by the present disclosure to control the air conditioner, the internal circulation fan and the external circulation fan of the energy storage container based on the current temperature parameter and the preset threshold parameter, and thus the temperature value in the energy storage container is controlled within the preset temperature range.

Figure 3:
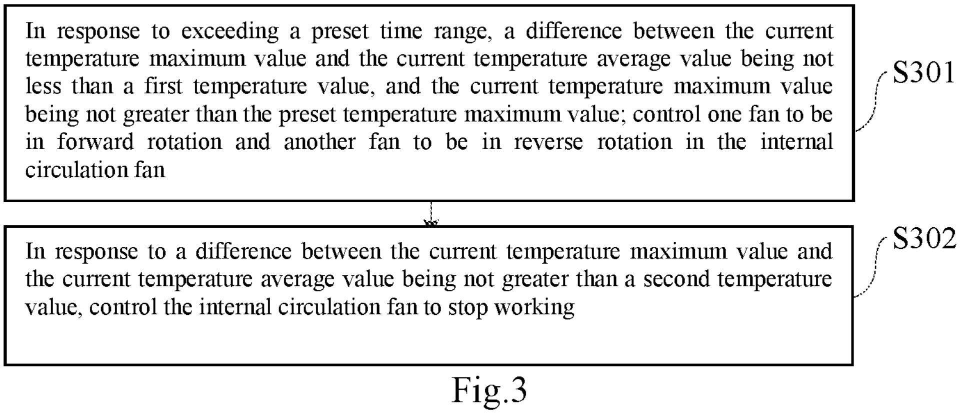
FIG. 3 shows a schematic diagram of an energy storage container temperature control method disclosed by another embodiment of the present disclosure.

As a possible implementation method, as shown in FIG. 3, based on the above-mentioned embodiment, in step S103, the specific process of controlling the air conditioner, the internal circulation fan and the external circulation fan of the energy storage container according to the current temperature parameter and the preset threshold parameter, controlling the temperature value in the energy storage container within the preset temperature range, comprises the following steps:

S301: In response to exceeding a preset time range, a difference between the current temperature maximum value and the current temperature average value being not less than a first temperature value, and the current temperature maximum value being not greater than the preset temperature maximum value, controlling one fan to be in forward rotation and another fan to be in reverse rotation in the internal circulation fan.

It should be noted that the present disclosure does not limit the setting of the preset time range and the first temperature value, which can be set according to the actual situation.

Optionally, the preset time range can be set to 5s and the first temperature value can be set to 5° C.

S302: In response to a difference between the current temperature maximum value and the current temperature average value being not greater than a second temperature value, controlling the internal circulation fan to stop working.

It should be noted that the present disclosure does not limit the setting of the second temperature value, which can be set according to the actual situation.

Optionally, the second temperature value can be set to 2° C.

Figure 4:
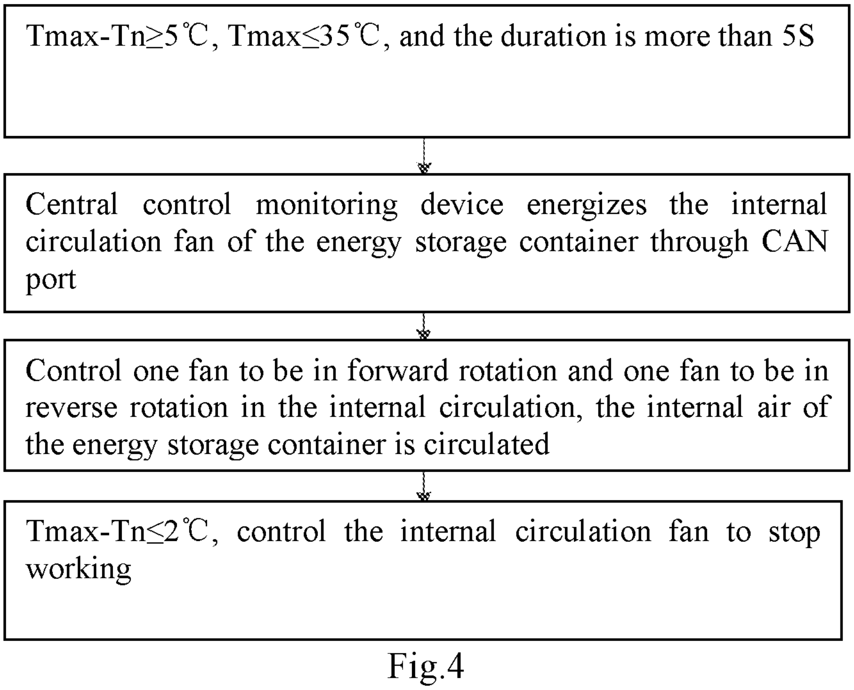
FIG. 4 is a flow schematic diagram of an energy storage container temperature control method disclosed by an embodiment of the present disclosure.

For example, as shown in FIG. 4, when the central control monitoring module collects the temperature signal, the difference between the current temperature maximum value and the current temperature average value is not less than the first temperature value, that is, Tmax-Tn≥5° C., and the current temperature maximum value is not greater than the preset temperature maximum value, that is, Tmax≤35° C., and the duration is more than 5S. The central control monitoring device energizes the internal circulation fan of the energy storage container through CAN (Controller Area Network) port to control one fan to be in forward rotation and one fan to be in reverse rotation in the internal circulation fan, so that the internal air of the energy storage container is circulated to equalize the internal temperature.

In response to the difference between the current temperature maximum value and the current temperature average value is not greater than the second temperature value, that is, Tmax-Tn≤2° C., the internal circulation fan is controlled to stop working, and the internal circulation end.

Figure 5:
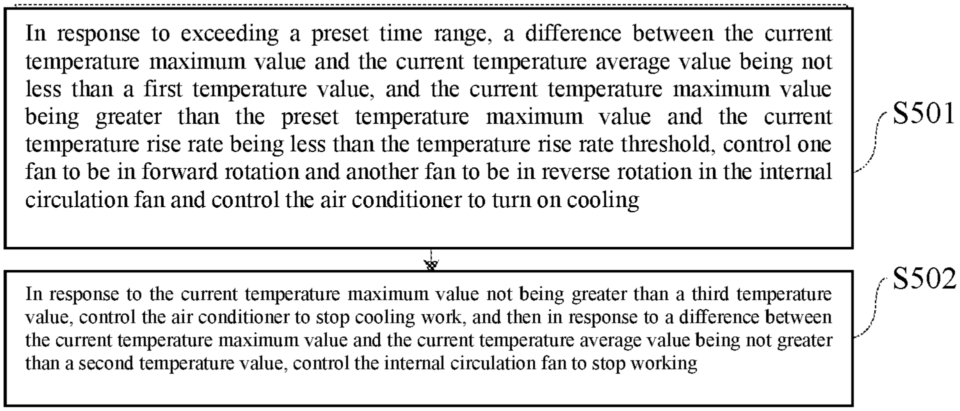
FIG. 5 is a schematic diagram of an energy storage container temperature control method disclosed by another embodiment of the present disclosure.

As a possible implementation, as shown in FIG. 5, based on the above-mentioned embodiment, in the step S103, the specific process of controlling an air conditioner, an internal circulation fan and an external circulation fan of the energy storage container according to the current temperature parameter and the preset threshold parameter to control a temperature value in the energy storage container within a preset temperature range comprises the following steps: S501: In response to exceeding a preset time range, a difference between the current temperature maximum value and the current temperature average value being not less than a first temperature value, and the current temperature maximum value being greater than the preset temperature maximum value and the current temperature rise rate being less than the temperature rise rate threshold, controlling one fan to be in forward rotation and another fan to be in reverse rotation in the internal circulation fan and controlling the air conditioner to turn on cooling.

It should be noted that the present disclosure does not limit the setting of the preset time range, the first temperature value and the temperature rise rate threshold, which can be set according to the actual situation.

Optionally, the preset time range can set to be 5s, the first temperature value can set to be 5° C., and the temperature rise rate threshold can set to be 0.5° C./S.

S502: In response to the current temperature maximum value being not greater than a third temperature value, controlling the air conditioner to stop cooling work, and a difference between the current temperature maximum value and the current temperature average value being not greater than a second temperature value, and controlling the internal circulation fan to stop working.

It should be noted that the present disclosure does not limit the setting of the second temperature value, the third temperature value, which can be set according to the actual situation.

Optionally, the second temperature value can set to be 2° C., and the third temperature value can set to be 28° C.

Figure 6:
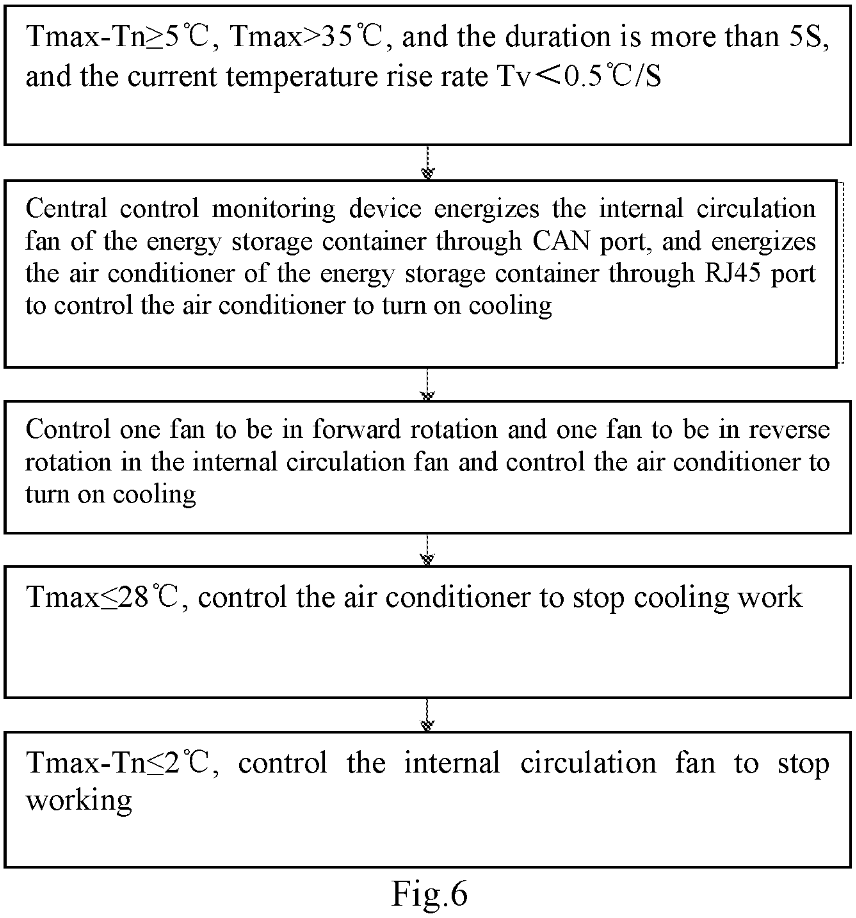
FIG. 6 is a flow schematic diagram of an energy storage container temperature control method disclosed by an embodiment of the present disclosure.

For example, as shown in FIG. 6, when the central control monitoring device collects the temperature signal, the difference between the current temperature maximum value and the current temperature average value is not less than the first temperature value, that is, Tmax-Tn≥5° C., the current temperature maximum value Tmax is >35° C., and the duration is more than 5S, and the current temperature rise rate Tv<0.5° C./S, the central control monitoring device energizes the internal circulation fan of the energy storage container through CAN (Controller Area Network) port, causing one fan in the internal circulation fan to rotate forward and the other fan to reverse, circulating air inside the energy storage container, and balancing the internal temperature. At the same time, the central control monitoring device energizes the air conditioner of the energy storage container through RJ45 (Registered Jack 45) port, and control the air conditioner to turn on (start) cooling. In response to the current temperature maximum value is not greater than the third temperature value Tmax≤28° C., control the air conditioner is controlled to stop cooling work. After the air conditioner stops cooling work, the difference between the current temperature maximum value and the current temperature average value is not greater than the second temperature value, that is, Tmax-Tn≤2° C., the internal circulation fan is controlled to stop working.

Figure 7:
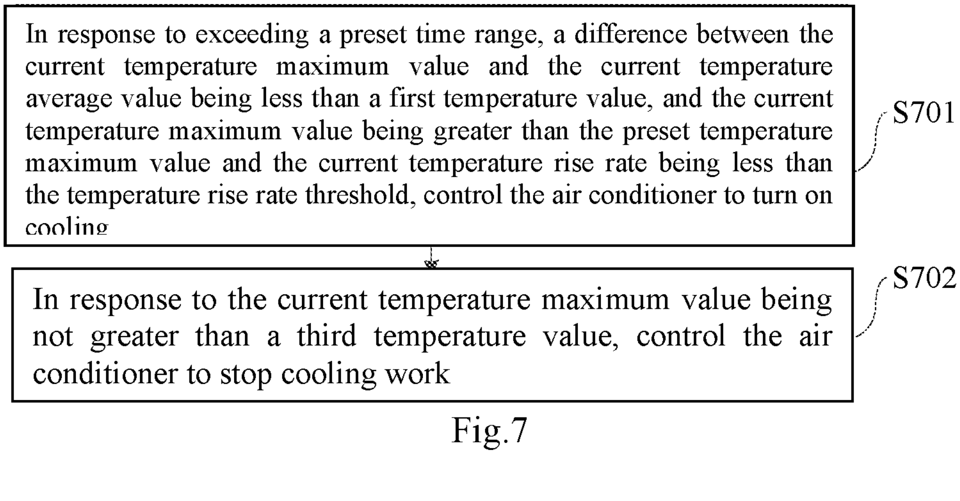
FIG. 7 is a schematic diagram of an energy storage container temperature control method disclosed by another embodiment of the present disclosure.

As a possible implementation method, as shown in FIG. 7, based on the above-mentioned embodiment, in step S103, the specific process of controlling the air conditioner, the internal circulation fan and the external circulation fan of the energy storage container according to the current temperature parameter and the preset threshold parameter, controlling the temperature value in the energy storage container within the preset temperature range, comprises the following steps:

S701: In response to exceeding a preset time range, a difference between the current temperature maximum value and the current temperature average value being less than a first temperature value, and the current temperature maximum value being greater than the preset temperature maximum value, and the current temperature rise rate being less than the temperature rise rate threshold, controlling the air conditioner to turn on cooling.

It should be noted that the present disclosure does not limit the setting of the preset time range, the first temperature value and the temperature rise rate threshold, which can be set according to the actual situation.

Optionally, the preset time range can be set to 5s, the first temperature value can be set to 5° C., and the temperature rise rate threshold can be set to 0.5° C./S.

S702: In response to the current temperature maximum value being not greater than a third temperature value, controlling the air conditioner to stop cooling work.

It should be noted that the present disclosure does not limit the setting of third temperature value, which can be set according to the actual situation.

Optionally, the third temperature value can be set to 28° C.

Figure 8:
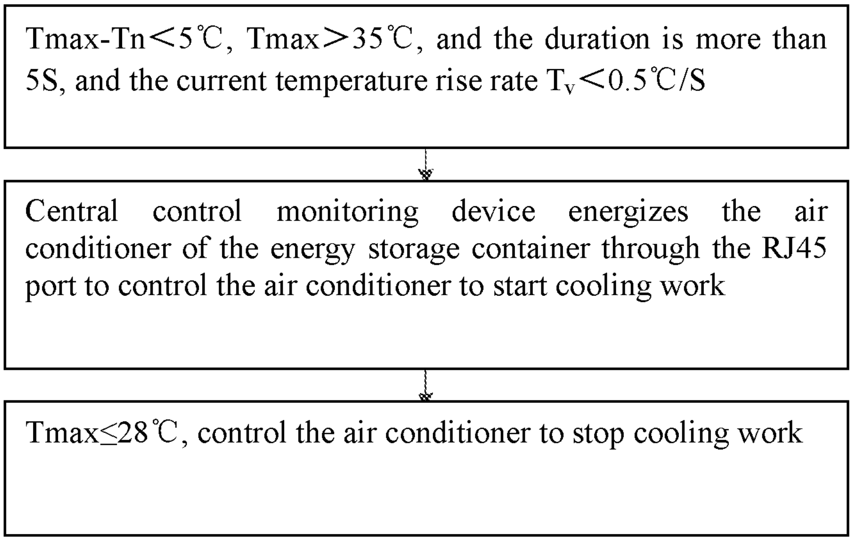
FIG. 8 is a flow schematic diagram of an energy storage container temperature control method disclosed by an embodiment of the present disclosure.

For example, as shown in FIG. 8, when the central control monitoring device collects a temperature signal, the difference between the current temperature maximum value and the current temperature average value is less that the first temperature value, that is, Tmax-Tn<5° C., the current temperature maximum value, Tmax is >35° C., and the duration is more than 5S, and the current temperature rise rate, $T_v$, is <0.5° C./S, the central control monitoring device energizes the air conditioner of the energy storage container through the RJ45(Registered Jack 45) port and control the air conditioner to start cooling work. In response to the current temperature maximum value being not greater than the third temperature value, that is, Tmax≤28° C., the air conditioner is controlled to stop cooling work.

Figure 9:
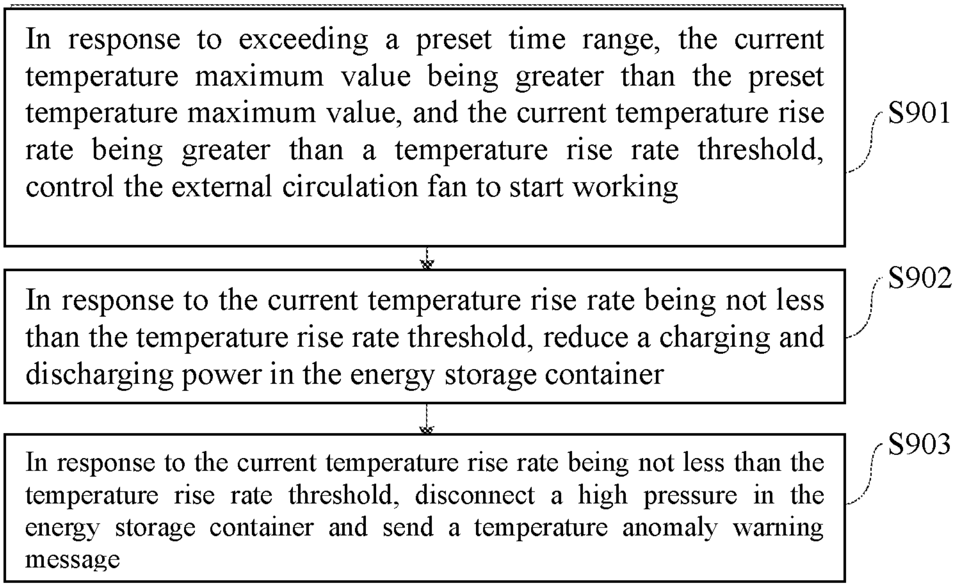
FIG. 9 is a schematic diagram of an energy storage container temperature control method disclosed by another embodiment of the present disclosure.

As a possible implementation method, as shown in FIG. 9, based on the above-mentioned embodiment, in step S103, the specific process of controlling the air conditioner, the internal circulation fan and the external circulation fan of the energy storage container according to the current temperature parameter and the preset threshold parameter, controlling the temperature value in the energy storage container within the preset temperature range, comprises the following steps:

S901: In response to exceeding a preset time range, the current temperature maximum value being greater than the preset temperature maximum value, and the current temperature rise rate being greater than a temperature rise rate threshold, controlling the external circulation fan to start working.

It should be noted that the present disclosure does not limit the setting of the preset time range and the temperature rise rate threshold, which can be set according to the actual situation.

Optionally, the preset time range can be set to 5s, and the temperature rise rate threshold can be set to 0.5° C./S.

S902: In response to the current temperature rise rate being not less than the temperature rise rate threshold, reducing a charging and discharging power in the energy storage container.

S903: After the step S902, in response to the current temperature rise rate being not less than the temperature rise rate threshold, disconnecting a high pressure in the energy storage container and sending out a temperature anomaly warning message.

Figure 10:
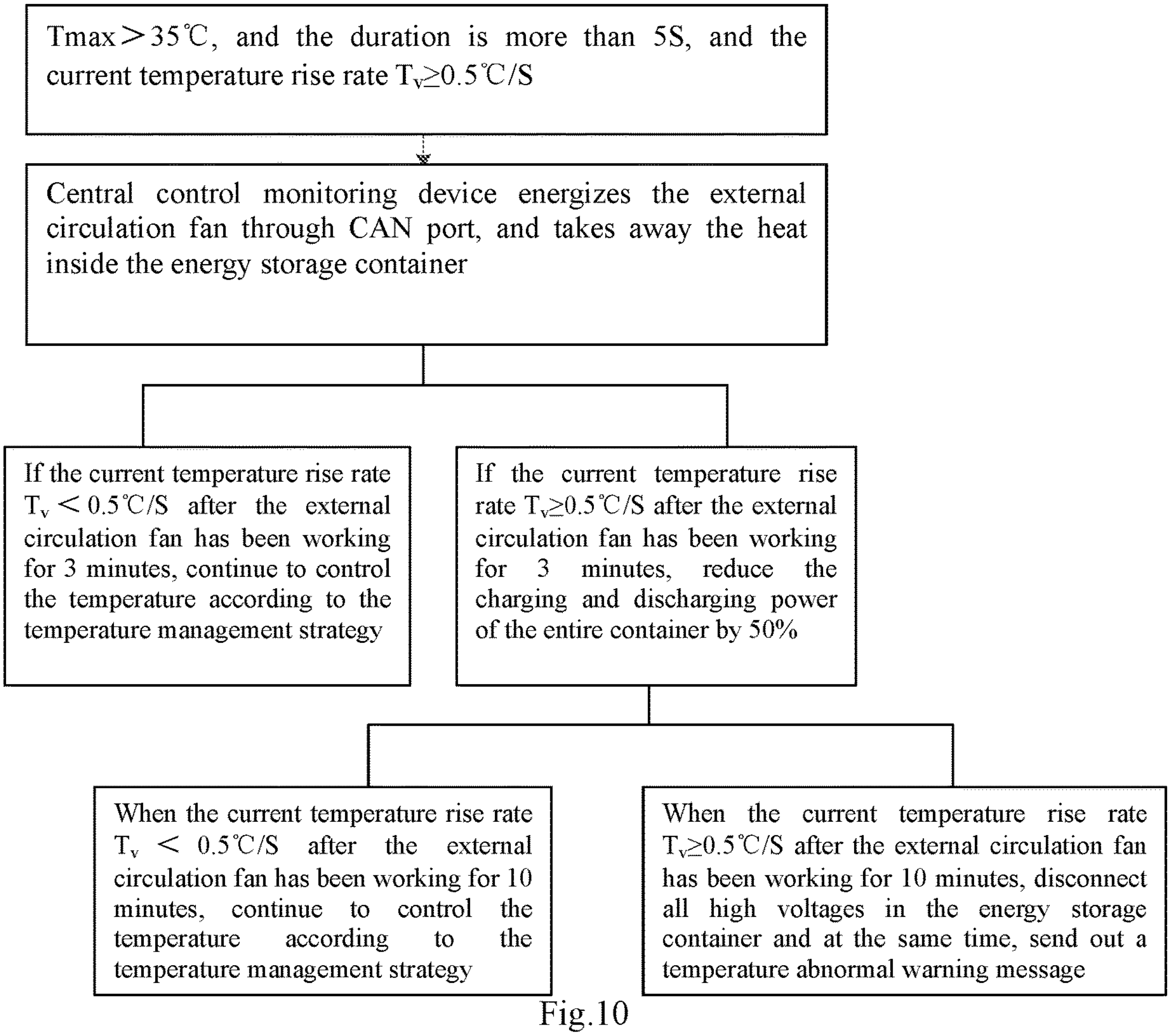
FIG. 10 is a flow schematic diagram of an energy storage container temperature control method disclosed by an embodiment of the present disclosure.

For example, as shown in FIG. 10, when central control monitoring device collects a temperature signal, the current temperature maximum value is greater than the preset temperature maximum value, that is, Tmax>35° C., the duration is more than 5S, and the current temperature rise rate $T_v \geq 0.5$° C./S(abnormal situation), the central control monitoring device energizes the external circulation fan through CAN port, and takes away the heat inside the energy storage container. If the current temperature rise rate Tv<0.5° C./S after the external circulation fan has been working for 3 minutes, continue to control the temperature according to the temperature management strategy. If the current temperature rise rate $T_v \geq 0.5$° C./S after the external circulation fan has been working for 3 minutes, the central control monitoring device automatically reduces the charging and discharging power of the entire container by 50%. If the current temperature rise rate $T_v < 0.5$° C./S after the external circulation fan has been working for 3 minutes, continue to control the temperature according to the temperature management strategy. If the current temperature rise rate $T_v < 0.5$° C./S after the external circulation fan has been working for 10 minutes, continue to control the temperature according to the temperature management strategy. If the current temperature rise rate $T_v \geq 0.5$° C./S after the external circulation fan has been working for 10 minutes, the central control monitoring device automatically disconnects all high voltages in the energy storage container, and at the same time, sends out a temperature abnormal warning message.

Figure 11:
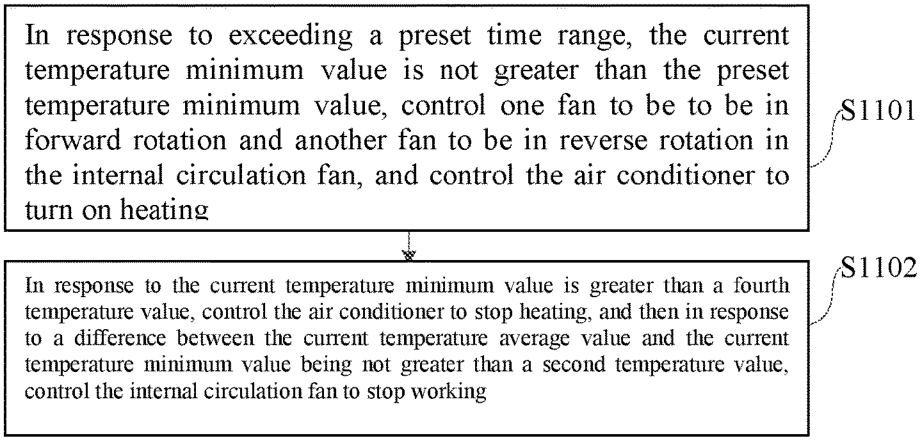
FIG. 11 is a schematic diagram of an energy storage container temperature control method disclosed by another embodiment of the present disclosure.

As a possible implementation method, as shown in FIG. 11, based on the above-mentioned embodiment, in the step S103, the specific process of controlling an air conditioner, an internal circulation fan and an external circulation fan of the energy storage container according to the current temperature parameter and the preset threshold parameter to control a temperature value in the energy storage container within a preset temperature range comprises the following steps: S1101: In response to exceeding a preset time range, the current temperature minimum value being not greater than the preset temperature minimum value, controlling one fan to be in forward rotation and another fan to be in reverse rotation in the internal circulation fan, and controlling the air conditioner to turn on heating.

It should be noted that the present disclosure does not limit the setting of the preset time range, which can be set according to the actual situation.

Optionally, the preset time range can be set to 5s.

S1102: In response to the current temperature minimum value being greater than a fourth temperature value, controlling the air conditioner to stop heating, and then in response to a difference between the current temperature average value and the current temperature minimum value being not greater than a second temperature value, controlling the internal circulation fan to stop working.

It should be noted that the present disclosure does not limit the setting of the fourth temperature value and the second temperature value, which can be set according to the actual situation.

Optionally, the fourth temperature value can be set to 25° C.; the second temperature value can be set to 2° C.

Figure 12:
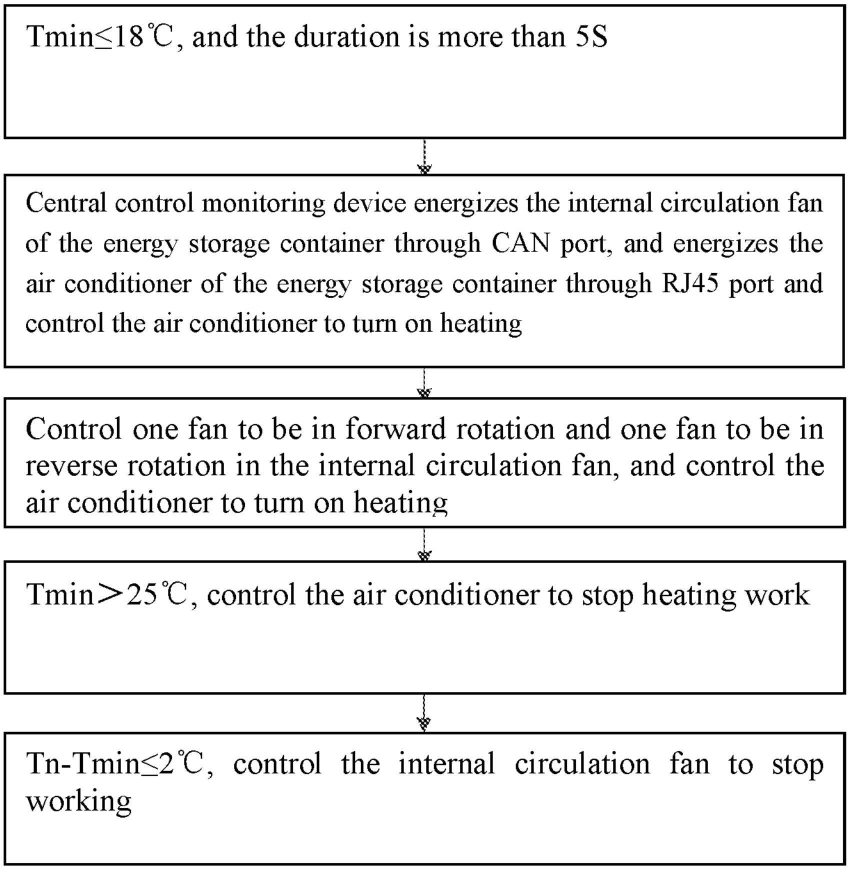
FIG. 12 is a flow schematic diagram of an energy storage container temperature control method disclosed by an embodiment of the present disclosure.

For example, as shown in FIG. 12, when the central control monitoring device collects a temperature signal, the current temperature minimum value is not greater than the preset temperature minimum value, that is, Tmin≤18° C., and the duration is more than 5S, the central control monitoring device energizes the internal circulation fan of the energy storage container through CAN (Controller Area Network) port, and control one fan to be in forward rotation and one fan to be in reverse rotation in the internal circulation fan, so that the internal air of the energy storage container is circulated to equalize the internal temperature. At the same time, the central control monitoring device energizes the air conditioner of the energy storage container through RJ45 (Registered Jack) port, control the air conditioner to turn on heating. When the current temperature minimum value is greater than the fourth temperature value, that is, Tmin>25° C., the air conditioner is controlled to stop heating work. After the air conditioner stops heating, the difference between the current temperature average value and the current temperature minimum value is not greater than the second temperature value, that is, Tn-Tmin≤2° C., the internal circulation fan is controlled to stop working.

An energy storage container temperature control method provided by the present display can control an air conditioner, an internal circulation fan and an external circulation fan of the energy storage container more scientifically and accurately based on different temperatures and the preset threshold parameters in the energy storage container, thereby improving the temperature control accuracy in the energy storage container, reducing the energy loss of the energy storage container itself and improving the security performance of the energy storage container.

Figure 13:
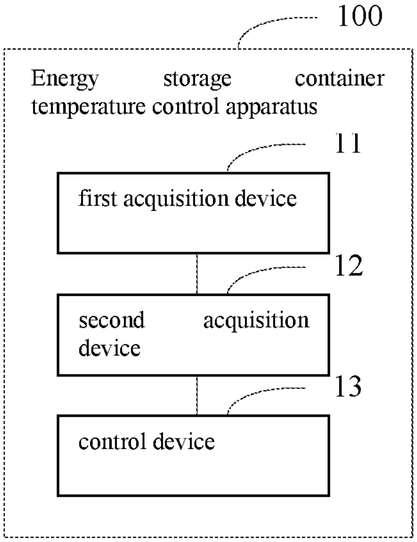
FIG. 13 is a structural schematic diagram of an energy storage container temperature control apparatus disclosed by an embodiment of the present disclosure.
Figure 14:
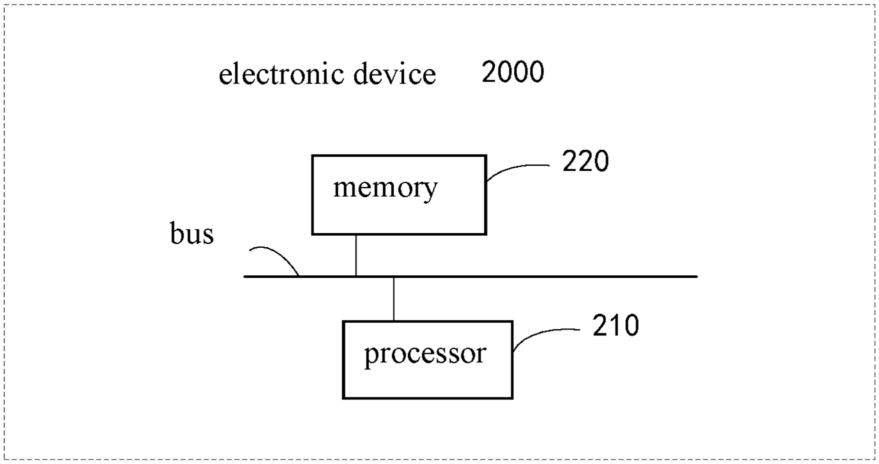
FIG. 14 is a structural schematic diagram of an electronic device disclosed by the present disclosure.

FIG. 13 is a structural schematic diagram of an energy storage container temperature control apparatus disclosed by an embodiment of the present disclosure.

As shown in FIG. 13, the energy storage container temperature control apparatus 100 comprises a first acquisition device 11, a second acquisition device 12 and a control device 13. Wherein

- a first acquisition device 11 is used for obtaining a current temperature parameter in an energy storage container;
- a second acquisition device 12 is used for obtaining a preset threshold parameter in the energy storage container, wherein the preset threshold parameter comprises a preset temperature maximum value and a preset temperature minimum value; in the embodiment of the present disclosure, the preset threshold parameter also comprises a temperature rise rate threshold; and
- a control device 13 is used for controlling an air conditioner, an internal circulation fan and an external circulation fan of the energy storage container based on the current temperature parameter and the preset threshold parameter, controlling a temperature value in the energy storage container within a preset temperature range.

According to an embodiment of the present disclosure, the current temperature parameter in the energy storage container comprises a current temperature maximum value in the energy storage container, a current temperature minimum value in the energy storage container, and a current temperature average value in the energy storage container. In the embodiment of the present disclosure, the current temperature parameter in the energy storage container also comprises a current temperature rise rate in the energy storage container.

According to an embodiment of the present disclosure, the first acquisition device 11 is also used to: collect a temperature in the energy storage container to obtain N temperature values according to a preset collection frequency by N temperature sensors set in the energy storage container, wherein N is a positive integer; sort the N temperature values in descending order, determine a first sorted temperature value as the current temperature maximum value in the energy storage container, and determine a last sorted temperature value as the current temperature minimum value in the energy storage container; and calculate the N temperature values to obtain the current temperature average value in the energy storage container.

According to an embodiment of the present disclosure, the control device 13 is also used to: in response to exceeding a preset time range, a difference between the current temperature maximum value and the current temperature average value being not less than a first temperature value, and the current temperature maximum value being not greater than the preset temperature maximum value, control one fan to be in forward rotation and another fan to be in reverse rotation in the internal circulation fan; and in response to a difference between the current temperature maximum value and the current temperature average value being not greater than a second temperature value, control the internal circulation fan to stop working.

According to an embodiment of the present disclosure, the control device 13 is also used to: in response to exceeding a preset time range, a difference between the current temperature maximum value and the current temperature average value being not less than a first temperature value, the current temperature maximum value being greater than the preset temperature maximum value and the current temperature rise rate being less than the temperature rise rate threshold, control one fan to be in forward rotation and another fan to be in reverse rotation in the internal circulation fan, and control the air conditioner to turn on cooling; in response to the current temperature maximum value being not greater than a third temperature value, control the air conditioner to stop cooling work, and in response to a difference between the current temperature maximum value and the current temperature average value being not greater than a second temperature value, control the internal circulation fan to stop working.

According to an embodiment of the present disclosure, the control device 13 is also used to: in response to exceeding a preset time range, a difference between the current temperature maximum value and the current temperature average value being less than a first temperature value, the current temperature maximum value being greater than the preset temperature maximum value, and the current temperature rise rate being less than the temperature rise rate threshold, control the air conditioner to turn on cooling; and in response to the current temperature maximum value being not greater than a third temperature value, control the air conditioner to stop cooling work.

According to an embodiment of the present disclosure, the control device 13 is also used to: in response to exceeding a preset time range, the current temperature maximum value being greater than the preset temperature maximum value, and the current temperature rise rate being greater than a temperature rise rate threshold, control the external circulation fan to start working; in response to the current temperature rise rate being not less than the temperature rise rate threshold, reduce a charging and discharging power in the energy storage container; and in response to the current temperature rise rate being not less than the temperature rise rate threshold, disconnect a high pressure in the energy storage container and send out a temperature anomaly warning message.

According to an embodiment of the present disclosure, the control device 13 is also used to: in response to exceeding a preset time range, the current temperature minimum value being not greater than the preset temperature minimum value, control one fan to be in forward rotation and another fan to be in reverse rotation in the internal circulation fan, and control the air conditioner to turn on heating; and in response to the current temperature minimum value being greater than a fourth temperature value, control the air conditioner to stop heating, and in response to a difference between the current temperature average value and the current temperature minimum value being not greater than a second temperature value, control the internal circulation fan to stop working.

The energy storage container temperature control apparatus provided by an embodiment of the present disclosure obtains the preset threshold parameter of the energy storage container by obtaining the current temperature parameter in the energy storage container, wherein the preset threshold parameter comprise a preset temperature maximum value, a preset temperature minimum value and a temperature rise rate threshold, the air conditioner, the internal circulation fan and the external circulation fan of the energy storage container are controlled according to the current temperature parameter and the preset threshold parameter, thereby the temperature value in the energy storage container is controlled within the preset temperature range. Therefore, the present disclosure can control the air conditioner, the internal circulation fan and the external circulation fan of the energy storage container more scientifically and accurately based on different temperatures and preset threshold parameters in the container, thereby improving the temperature control accuracy in the energy storage container and reducing the energy loss of the energy storage container itself and improving the security performance of the energy storage container.

In order to achieve the above-mentioned embodiment, the present disclosure also provides an electronic device 2000, comprising: a memory 220, a processor 210, and a computer program stored on the memory 220 and capable of running on the processor 210, when the processor executes the computer program, the foregoing energy storage container temperature control method can be implemented.

In order to achieve the above-mentioned embodiment, the present disclosure also provides a non instantaneous computer-readable storage medium that stores computer instructions, which are used to enable the above-mentioned energy storage container temperature control method to be implemented during computer execution.

In the description of the present disclosure, it should be understood that the orientation or positional relationship indicated by the terms “center”, “vertical direction”, “horizontal direction”, “length”, “width”, “thickness”, “up”, “down”, “front”, “back”, “left”, “right”, “vertical”, “horizontal”, “top”, “bottom”, “inside”, “outside”, “clockwise”, “counterclockwise”, “axial”, “radial” and “circumferential” and the like is based on the orientation or positional relationships shown in the attached drawings, which is only for the convenience of describing the present application and simplifying the description, rather than indicating or implying that the indicated apparatus or component must have a specific orientation, be constructed and operated in a specific orientation, and therefore cannot be understood as a limitation on the present disclosure.

In addition, the terms "first" and "second" are only used to describe the purpose and cannot be understood as indicating or implying relative importance or implying the quantity of technical features indicated. Therefore, features limited to "first" and "second" can explicitly or implicitly comprise one or more of these features. In the description of the present disclosure, "multiple" means two or more, unless otherwise specified.

In the present disclosure, unless otherwise specified and limited, the terms "installation", "connected", "connection", "fixation" and other terms should be broadly understood, for example, they can be fixed connections, detachable connections, or integrated. It can be a mechanical connection or an electrical connection. It can be directly connected or indirectly connected through an intermediate medium, which can be the internal connection between two components or the interaction relationship between two components. For those skilled in the art, the specific meanings of the above-mentioned terms in the present disclosure can be understood based on specific circumstances.

In the present disclosure, unless otherwise specified and limited, the first feature on the "up" or "down" of the second feature can be direct contact between the first feature and the second feature, or indirect contact between the first feature and the second feature through intermediate media. Moreover, the first feature is "above" the second feature, in the "up direction" of the second feature, and on "the surface" of the second feature can be either directly or diagonally above the second feature, or simply indicate that the first feature is horizontally higher than the second feature. The first feature is "below" the second feature, "under" the second feature, and on "the below surface" of the second feature can be either directly or diagonally below the second feature, or simply indicate that the first feature is horizontally less than the second feature.

In the description of this specification, the reference terms "one embodiment", "some embodiments", "examples", "specific examples", or "some examples" and the like refer to the specific features, structures, materials, or features described in conjunction with the embodiment or examples comprised in at least one embodiment or example of the present disclosure. In this specification, the schematic expressions of the above terms do not necessarily refer to the same embodiment or example. Moreover, the specific features, structures, materials, or characteristics described can be combined in an appropriate manner in any one or more embodiments or examples. In addition, those skilled in the art can combine and assemble the different embodiments or examples and the features of different embodiments or examples described in this specification without conflicting with each other.

Although the embodiment of the present disclosure has been shown and described above, it can be understood that the above-mentioned embodiment is exemplary and cannot be understood as a limitation on the present disclosure. The ordinary technical person in the art can make changes, modifications, substitutions, and variations to the above-mentioned embodiments within the scope of the present disclosure.

What is claimed is:

1. An energy storage container temperature control method, comprising:

obtaining a current temperature parameter in the energy storage container, wherein the current temperature parameter in the energy storage container comprises a current temperature maximum value in the energy storage container, a current temperature minimum value in the energy storage container, a current temperature average value in the energy storage container, and a current temperature rise rate in the energy storage container;

obtaining a preset threshold parameter of the energy storage container, wherein the preset threshold parameter comprises a preset temperature maximum value, a preset temperature minimum value, and a temperature rise rate threshold; and controlling an air conditioner, an internal circulation fan and an external circulation fan of the energy storage container according to the current temperature parameter and the preset threshold parameter to control a temperature value in the energy storage container within a preset temperature range, wherein the controlling of the air conditioner, the internal circulation fan and the external circulation fan of the energy storage container according to the current temperature parameter and the preset threshold parameter, comprises:

in response to exceeding a preset time range, a difference between the current temperature maximum value and the current temperature average value being not less than a first temperature value, and the current temperature maximum value being greater than the preset temperature maximum value and the current temperature rise rate being less than the temperature rise rate threshold, controlling one fan in forward rotation and another fan in reverse rotation in the internal circulation fan and controlling the air conditioner to turn on cooling; and in response to the current temperature maximum value being not greater than a third temperature value, controlling the air conditioner to stop cooling work, and in response to a difference between the current temperature maximum value and the current temperature average value being not greater than a second temperature value, controlling the internal circulation fan to stop working.

2. The method according to claim 1, wherein the obtaining of the current temperature parameter in the energy storage container, comprises:

collecting a temperature in the energy storage container to obtain N temperature values according to a preset collection frequency by setting N temperature sensors in the energy storage container, wherein N is a positive integer;

sorting the N temperature values in a descending order, determining a first sorted temperature value as the current temperature maximum value in the energy storage container, and determining a last sorted temperature value as the current temperature minimum value in the energy storage container; and calculating the N temperature values to obtain the current temperature average value in the energy storage container.

3. An electronic device, comprising:

a memory;

a processor; and a computer program stored on the memory and executed by the processor, wherein during the execution of the computer program by the processor, the energy storage container temperature control method as claimed in claim 1 is implemented.

* * * * *